Nov. 29, 1960     E. S. BENEVALL     2,962,327
SELF-LUBRICATING BEARING
Filed Oct. 6, 1958
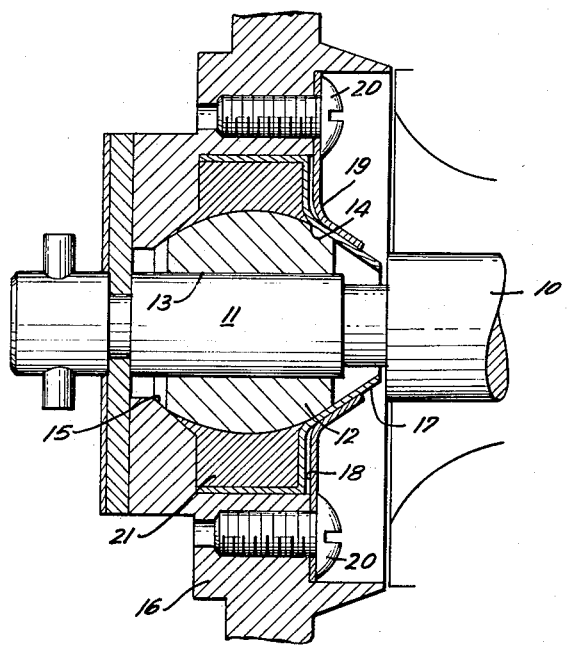
INVENTOR.
Erik Syffrid Benevall
BY
Edward A. Venanda
his ATTORNEY

United States Patent Office 2,962,327
Patented Nov. 29, 1960

2,962,327
SELF-LUBRICATING BEARING
Erik Sigfrid Benevall, Johanneshov, Sweden, assignor to Aktiebolaget Electrolux, Stockholm, Sweden, a corporation of Sweden
Filed Oct. 6, 1958, Ser. No. 765,629
Claims priority, application Sweden Oct. 9, 1957
4 Claims. (Cl. 308—121)

This invention relates to the bearing art and more particularly to so-called self-lubricating bearings.

Bearings employing a porous bearing element, usually formed from sintered metal powders, of iron or copper-tin-bronze, for example, are well known. As ordinarily employed, such porous bearing elements are impregnated with a lubricant and the shelf-lubricating properties arise because of the different coefficients of expansion of oil and the metal or metals forming the bearing element. Thus, as the temperature of the bearing element rises due to the effect of friction during use, the lubricant exudes from the porous bearing element because of its higher coefficient of expansion.

It is also well known to employ the porous bearing element in combination with an exteriorly disposed lubricant supply, usually in the form of an oil-impregnated felt wick so that lubricant is continually supplied to the porous bearing element during use. Such arrangements have not been entirely satisfactory, however, particularly because the felt wick or the like tends to carbonize after being subjected to the relatively high temperature occurring during operation of the bearing.

In the art of bearings which are not self-lubricating, it has heretofore been proposed that a so-called depot grease be employed, containing a lithium-base or like soap having the ability to absorb relatively large quantities of oil. Use of such depot greases with porous, self-lubricating bearings has, however, proved impractical since the entry of even a small amount of the grease into the journal tends to close the pores of the bearing element, so preventing the lubricant from escaping therefrom to the bearing surface. Further, increased bearing temperatures tend to cause chemical decomposition, and resulting increased viscosity of the depot grease, so that an increase in the bearing friction occurs.

The present invention is based upon the discovery that certain novel lubricant compositions can be employed in cooperation with porous, self-lubricating bearing elements.

An object of the present invention is to provide a bearing assembly in which a porous, self-lubricating bearing element is maintained in contact with a lubricating composition which is capable of progressively yielding lubricant to the bearing element and is free from the disadvantages heretofore presented by the above-mentioned prior art lubricant supplies.

Another object is to provide novel and particularly effective lubricant-supplying compositions.

In order that the manner in which these and other objects are attained in accordance with the invention can be more readily understood, the invention will be described with reference to the accompanying drawing, which forms a part of this specification, and wherein the single figure is a longitudinal sectional view, with some parts shown in elevation, of a bearing assembly in accordance with the invention.

Referring to the drawing, the bearing assembly comprises the shaft 10, which may be, for example, the high speed shaft of an electric motor. Shaft 10 has a journal pin 11 of reduced diameter disposed within the inner cylindrical surface of a sintered, copper-tin-bronze, porous, self-lubricating bearing element 12. In accordance with the usual practice, the cylindrical bearing surface 13 of element 12 has a slightly larger diameter than the diameter of the journal pin 11. Thus, the difference in diameters may be on the order of 7 microns (0.007 mm.).

The outer surface 14 of bearing element 12 is in the form of a part of a sphere and is engaged at one end of the bearing element by housing 16. At the opposite end of the bearing element, outer surface 14 is embraced by a conical sheet metal cap 17 held in place by a washer 19 secured by screws 20. It will thus be seen that the housing 16 and metal cap 17 define three walls of a chamber 18 the fourth wall of which is constituted by the surface 14 of the bearing element, such chamber being completely closed except for a suitable access fitting, not shown, via which the lubricant-supplying compositions of my invention can be introduced.

In accordance with the invention, there is disposed within chamber 18, so as to be in contact with the outer surface 14 of the porous bearing element 12, a lubricant-supplying composition comprising a uniform mixture of a lubricating oil and a finely divided, solid, absorbent carrier material, such composition being indicated at 21. The lubricant-supplying composition is so constituted as to have a consistency ranging from a paste to a dough, so that the same can be injected into the chamber 21 by means of a conventional metering nozzle and will come into contact with and adhere to outer surface 14 of the bearing element 12.

As carrier materials, I employ inorganic particulate solids having a predominant particle size ranging from less than one micron to not more than 100 microns, the predominant particle size advantageously being less than about 60 microns, the hardness of the particles being less than 3 on Mohs hardness scale and the effective porosity of the carrier material being of the same order of magnitude as that of the porous bearing element 12. Advantageously, I employ mineral talc [$H_2Mg_3(SiO_3)_4$], any of the naturally occurring and specially prepared forms of magnesium silicate usually accepted as the equivalent of talc, calcium carbonate, or mixtures of talc and calcium carbonate.

Such finely divided carrier materials are particularly suited for use in my compositions not only because of their favorable hygroscopicity, giving them the ability to retain conventional lubricating oils by absorption, and to yield the oil to the porous bearing element, but also because such solid materials are soft as compared to the materials ordinarily employed for porous bearing elements, so that any particles of the carrier material which find their way to the working surface of the bearing will do no damage. Further, since these carrier materials are good electrical insulators, they are particularly suitable for use in the bearings of electrical motors. Finally, these carrier materials are light in color and, of particular importance, have relatively high resistance to heat, so as to be substantially unaffected by prolonged exposure to the operating conditions of the bearings.

It is particularly important that the absorbent carrier material be relatively soft. In this connection, it is to be noted that talc has a Mohs hardness of 1–1.5 and that the Mohs hardness of amorphous, prepared calcium carbonate is substantially less than 3.

As the lubricant, I can advantageously employ the conventional silicone oils, the usual mineral (paraffin) lubricating oils, or compatible mixtures of such materials.

The silicone oils may particularly consist of dimethyl polysiloxanes having a viscosity in the range of 50 to 500 centistokes at 25 degrees centigrade, but silicone oils of the type polyethylsiloxane or polymethyl, phenylsiloxane can also be used. As a substitute for the usual mineral oils it is possible to use synthetic oils of the type polyalkylene glycol. Generally it may be said that additionally to mineral oils, most synthetic fluids intended for lubricating purposes may be used for the novel lubricant composition. A condition is, however, that the fluid has a viscosity which is suitable for a self-lubricating slide bearing, and that other general requirements on a lubricating oil are complied with.

Compositions of the desired consistency are prepared by uniformly blending the lubricating oil and the finely divided carrier, in any suitable mixing apparatus, in proportions of 50–70% by weight of carrier material and 50–30% by weight of the oil. When such proportions are employed, the paste- or dough-like mixture is of such consistency as to be capable of being readily introduced to chamber 18 by a conventional metering nozzle, and, when so introduced, adheres well to the outer surface 14 of the porous bearing element along the entire exposed width thereof, so that the lubricating oil can flow directly from the oil-carrier mixture into the pores of the bearing element.

Employing the oil and carrier in the relative proportions just mentioned, the resulting composition has a consistency such that the penetration number, in tenths of a mm., is from about 250 to not more than 400, as determined in accordance with the American Society of Testing Materials Procedure Designation D 217–44 T, Method of Test for Cone Penetration of Lubricating Grease (tentative). Within the proportional limits above recited for the carrier and the oil, the resulting composition can advantageously be designed to have a consistency such that the penetration number is within the range of 275–350, by the same test procedure.

Within the aforesaid limits, it will be understood that the proportions of oil and carrier can be precisely determined, so that the resulting composition will supply the oil to the porous bearing element at precisely the rate most advisable for that particular bearing element.

The following examples are typical for the lubricant supplying compositions of my invention:

Example 1

Forty-three parts by weight of a conventional silicone lubricating oil having a viscosity of 200 centistokes at 25° C. and a specific gravity of 0.97 is blended, in a motorized mixer, with 57 parts by weight powdered talc of a particle size predominantly in the range of from less than 1 micron to about 60 microns, a substantial proportion of the talc particles being rounded. The resulting uniform paste has a specific gravity of 1.51 and a penetration number of about 325, determined in accordance with ASTM designation D217–44T. The paste is of such consistency as to be readily injectable, in measured amounts, into the chamber 18 of a bearing assembly of the type hereinbefore described, using a conventional metering nozzle. When employed in such a bearing assembly in the manner described, the composition withstands operating temperatures of at least 200° C. and yields oil to a conventional porous copper-tin-bronze bearing element at substantially the rate required during normal use of such self-lubricating bearing element, the porosity of the talc content of the paste being of substantially the same order of magnitude as the porosity of the porous copper-tin-bronze bearing element.

Example 2

A similar lubricant-supplying paste is prepared by uniformly blending 48.5 parts by weight of the same silicone oil employed in Example 1 with 51.5 parts by weight of commercially prepared, amorphous calcium carbonate.

Example 3

A lubricant-supplying composition suitable for use at somewhat lower temperatures, on the order of 75° C., is prepared by uniformly mixing 61.5 parts by weight of powdered talc, having the characteristics set out in Example 1, with 38.5 parts by weight of a medium-thick mineral (paraffin) lubricating oil having a viscosity of about 100 centistokes at 25° C.

Example 4

A doughy composition, for use at temperatures on the order of 75° C., is prepared, using the same materials as in Example 3, except that about 70 parts by weight of the talc, and about 30 parts by weight of the mineral oil, are employed. While of thicker consistency than the composition of Example 3, this composition still has the ability to adhere to the outer surface 14 of the porous bearing element and to yield its lubricating oil content to the pores of the bearing element.

In all of the examples, the oil-carrier compositions have a consistency such that the penetration number, obtained by ASTM designation D217–44T, is in the range of 250–400. In all of the compositions, it will be noted that the amount of carrier, by weight, is at least equal to the amount of oil.

The embodiments of the invention herein illustrated and described have been chosen for illustrative purposes and various changes and modifications are therefore possible without departing from the scope of the appended claims.

What is claimed is:

1. In a self-lubricating bearing assembly, the combination of a shaft, a porous bearing element engaging said shaft and having an exposed surface, and means defining a chamber to the interior of which said exposed surface is exposed, said chamber containing a quantity of a lubricant-supplying composition consisting essentially of 50–70% by weight of a finely divided talc as a solid inorganic absorbent carrier material and 50–30% by weight of a lubricating oil, said talc being in the form of particles having a hardness not exceeding 3 on Mohs hardness scale, said composition having a penetration number of 250–400, in tenths of a mm., being of a consistency in the range from pasty to doughy, disposed in a direct contact with said exposed surface of the porous bearing element, and capable of giving up said lubricating oil progressively to said porous bearing element under conditions of bearing operation.

2. In a self-lubricating bearing assembly, the combination of a shaft, a porous bearing element engaging said shaft and having an exposed surface, and means defining a chamber to the interior of which said exposed surface is exposed, said chamber containing a quantity of a lubricant-supplying composition consisting essentially of 50–70% by weight of a finely divided calcium carbonate as a solid inorganic absorbent carrier material and 50–30% by weight of a lubricating oil, said calcium carbonate being in the form of particles having a hardness not exceeding 3 on Mohs hardness scale, said composition having a penetration number of 250–400, in tenths of a mm., being of a consistency in the range from pasty to doughy, disposed in direct contact with said exposed surface of the porous bearing element, and capable of giving up said lubricating oil progressively to said porous bearing element under conditions of bearing operation.

3. A bearing assembly in accordance with claim 1 and wherein said composition consists essentially of 55–60% by weight of talc having a particle size predominantly less than 60 microns and 40–45% by weight of a silicone oil having a viscosity of about 200 centistokes at 25° C.

4. A bearing assembly in accordince with claim 2 and wherein said composition consists essentially of 50–55% by weight of calcium carbonate and 45–50% by weight of a silicone oil having a viscosity of about 200 centistokes at 25° C.

References Cited in the file of this patent

UNITED STATES PATENTS

| | | |
|---|---|---|
| 2,012,952 | Brinker et al. | Sept. 3, 1935 |
| 2,444,271 | Smith | June 29, 1948 |
| 2,704,232 | Johnson et al. | Mar. 15, 1955 |